(12) United States Patent
Wang et al.

(10) Patent No.: US 11,244,585 B2
(45) Date of Patent: Feb. 8, 2022

(54) DISPLAY APPARATUS

(71) Applicant: DYNASCAN TECHNOLOGY CORP., Taoyuan (TW)

(72) Inventors: Tsun-I Wang, Taoyuan (TW);
Ching-Chun Wu, Taoyuan (TW);
Chia-Liang Yang, Taoyuan (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 149 days.

(21) Appl. No.: 16/156,040

(22) Filed: Oct. 10, 2018

(65) Prior Publication Data

US 2020/0118472 A1   Apr. 16, 2020

(51) Int. Cl.
| | | |
|---|---|---|
| G09G 3/00 | (2006.01) | |
| G02F 1/13357 | (2006.01) | |
| G02F 1/1333 | (2006.01) | |
| H04W 4/12 | (2009.01) | |
| G02F 1/133 | (2006.01) | |
| H05B 45/14 | (2020.01) | |

(52) U.S. Cl.
CPC ......... *G09G 3/006* (2013.01); *G02F 1/13318* (2013.01); *G02F 1/133385* (2013.01); *G02F 1/133603* (2013.01); *H04W 4/12* (2013.01); *H05B 45/14* (2020.01); *G09G 2320/041* (2013.01); *G09G 2330/12* (2013.01); *G09G 2360/144* (2013.01)

(58) Field of Classification Search
CPC ............. G09G 3/006; G09G 2320/041; G09G 2330/12; G09G 2360/144; H05B 45/14; G02F 1/13318; G02F 1/133385; G02F 1/133603; H04W 4/12
See application file for complete search history.

(56) References Cited

U.S. PATENT DOCUMENTS

| | | | |
|---|---|---|---|
| 8,125,163 B2 | 2/2012 | Dunn et al. | |
| 8,508,155 B2 | 8/2013 | Schuch | |
| 2007/0035950 A1* | 2/2007 | Yang | G02B 6/0085 362/294 |
| 2007/0047261 A1* | 3/2007 | Thompson | G02B 6/0028 362/623 |
| 2009/0289580 A1* | 11/2009 | Dunn | H05B 47/10 315/307 |
| 2010/0245720 A1* | 9/2010 | Moriya | G02F 1/133603 349/70 |
| 2011/0096246 A1 | 4/2011 | Dunn et al. | |
| 2012/0154706 A1* | 6/2012 | Cho | G09G 3/3648 349/58 |
| 2013/0278868 A1 | 10/2013 | Dunn et al. | |
| 2018/0286329 A1* | 10/2018 | Endo | G09G 3/3688 |

* cited by examiner

*Primary Examiner* — Son T Le
*Assistant Examiner* — Adam S Clarke
(74) *Attorney, Agent, or Firm* — Duane Morris LLP

(57) ABSTRACT

A display apparatus is provided. The display apparatus comprises a display unit, a backlight module, an optical cavity and at least one sensing device. The optical cavity is formed between the display unit and the backlight module. The at least one sensing device is disposed on the periphery of the optical cavity for sensing the display unit.

8 Claims, 10 Drawing Sheets

DISPLAY APPARATUS

BACKGROUND

1. Field of the Disclosure

The present disclosure relates to a display apparatus. More particularly, the present disclosure relates to a display apparatus including one or more sensing devices.

2. Description of the Related Art

As display apparatuses are widely used in different environments, how to ensure the reliability and robustness of display apparatuses under harsh conditions has become an important issue. For example, if a display apparatus is placed outdoors, the irradiation of sunlight may cause the temperature of the display apparatus to rise rapidly. The heat accumulated in the display apparatus may cause problems such as liquefaction or yellowing of the liquid crystal layer of the display apparatus. Furthermore, heat generated by the light source module of the display apparatus may also increase the temperature inside the display apparatus.

In order to determine whether the display apparatus is functioning properly, a sensor may be placed in front of a small portion of the viewing surface of the display, so as to detect whether the image displayed on the small portion of the viewing surface is normal. However, the sensor will shield a small portion of the viewing surface. Alternatively, temperature sensors may be mounted on a circuit board with the light source module, so as to monitor the temperature inside the display. Nevertheless, the detected temperature cannot precisely reflect the temperature of sensitive devices, such as the liquid crystal layer.

SUMMARY

In view of the above, there is a need to provide a display apparatus with a more precise self-detection capability, so as to ensure that the display apparatus is functioning properly and to make the display apparatus have a longer lifetime.

In one aspect according to some embodiments, a display apparatus comprises a display unit, a backlight module, an optical cavity, and at least one sensing device. The optical cavity is formed between the display unit and the backlight module. The at least one sensing device is disposed on the periphery of the optical cavity for sensing the display unit.

In a preferred embodiment, the least one sensing device may be at least one camera or at least one light sensor.

In one aspect according to some embodiments, a display apparatus comprises a liquid crystal layer, a backlight module, an optical cavity, and at least one sensing device. The optical cavity is formed between the display unit and the backlight module. The at least one sensing device is disposed on the periphery of the optical cavity for sensing the temperature of the liquid crystal layer.

Other aspects and embodiments of the present disclosure are also contemplated. The foregoing summary and the following detailed description are not meant to limit the present disclosure to any particular embodiment but are merely meant to describe some embodiments of the present disclosure.

BRIEF DESCRIPTION OF THE DRAWINGS

For a better understanding of the nature and objects of some embodiments of the present disclosure, reference should be made to the following detailed description taken in conjunction with the accompanying drawings. In the drawings, identical or functionally identical elements are given the same reference numbers unless otherwise specified.

DETAILED DESCRIPTION

Figure 1A:
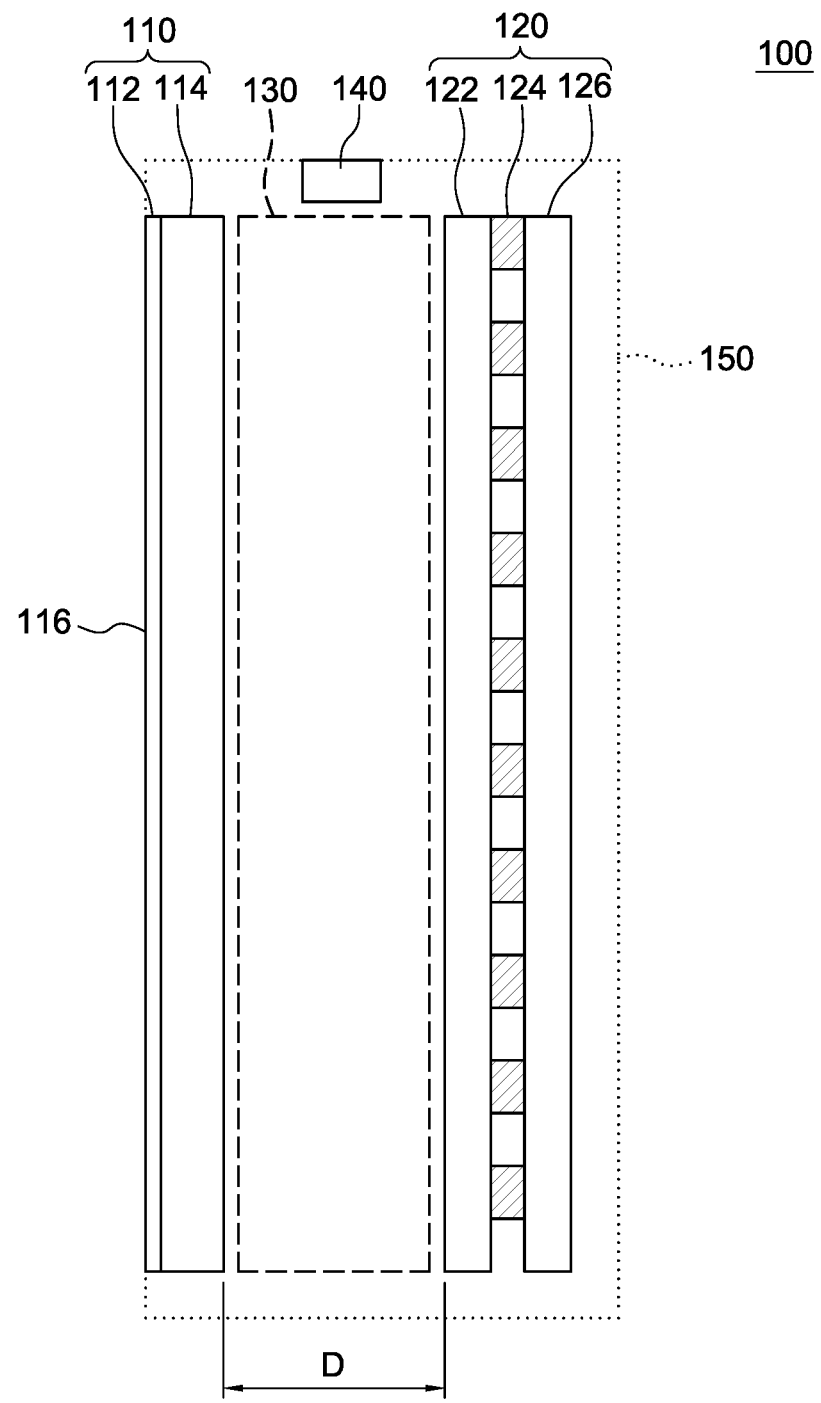
FIG. 1A is a cross-sectional view of a display apparatus according to some embodiments of the present disclosure.

FIG. 1A is a cross-sectional view of a display apparatus according to some embodiments of the present disclosure. As shown in FIG. 1A, the display apparatus 100 includes a display unit 110, a backlight module 120, an optical cavity 130, a sensing device 140, and a housing 150. The light emitted by the backlight module 120 passes through the optical cavity 130 and the display unit 110. Thus, a user in front of the display apparatus 100 can see an image shown on the display unit 110. The sensing device 140 is disposed on the periphery of the optical cavity 130 for sensing the display unit 110. The sensing device 140 may be a camera, a light sensor or a temperature sensor for sensing the display unit 110, so as to determine whether the display unit 110 is functioning properly or whether the display unit 110 works in a harsh environment. In this embodiment, the display apparatus 100 can be, for example, a liquid crystal display with a direct LED backlight module.

In a preferred embodiment, the display unit 110 includes a protective glass 112 and a liquid crystal layer 114. The backlight module 120 includes one or more optical films 122, a plurality of light sources 124, and a backlight assembly 126 for mounting the light sources 124. The light sources 124 can be, for example, a plurality of LEDs, which may be placed on the front surface of the backlight assembly 126 to provide backlight illumination for the display unit 100. The one or more optical films 122 can be, for example, a light diffuser, a light reflector, a brightness enhancement film, or a combination of two or more thereof. The type and number of optical films to be used are not limited here. As shown in FIG. 1A, the optical cavity 130 is formed between the display unit 110 and the backlight module 120 and, particularly, formed between the liquid crystal layer 114 and the optical films 122 of the backlight module 120. The distance D between the liquid crystal layer 114 and the optical films 122 is at least approximately 0.1 mm. It should be noted that the distance D can be properly adjusted based on situational needs such that the sensing device 140 can be arranged between the liquid crystal layer 114 and the optical films 122 and can accurately detect the display unit 110 through the optical cavity 130.

The sensing device 140 is disposed on the periphery of the optical cavity 130. In some embodiments, the sensing device 140 is mounted on an inner side of the housing 150. In some embodiments, the sensing device 140 can be, for example, a temperature sensing device facing toward the liquid crystal layer 114. The temperature sensing device can be, for example, an infrared (IR) detector. The temperature sensing device can directly measure the temperature of the liquid crystal layer 114 without any device blocked between the temperature sensing device and the liquid crystal layer 114. The temperature sensing device can thus measure the temperature of the liquid crystal layer 114 and determine whether the liquid crystal layer 114 works under normal conditions. It should be noted that the sensing device 140 (i.e., the temperature sensing device) is disposed inside the display apparatus 100 without blocking any viewing surface 116. In some embodiments, the sensing device 140 may include another temperature sensing device which measures the temperature of the optical films 122, the backlight module 120, the optical cavity 130 or other components in the display apparatus 100.

In some embodiments, the sensing device 140 can be, for example, a light sensor (e.g., an ambient light sensor). The light sensor can measure ambient light entering the display unit 110. In a preferred embodiment, it is determined that the display unit 110 is functioning properly if the detected light varies with time. In some embodiments, the sensing device 140 can be, for example, a camera. The camera can capture an image from a portion of the display unit 110 through the optical cavity 130. The camera can be any image capturing device with image capturing functions. It should be noted that the display apparatus 100 may include one or more sensing devices 140, and the one or more sensing devices 140 can, for example, be a temperature sensing device, a light sensor, a camera, or a combination of two or more thereof.

Figure 1B:
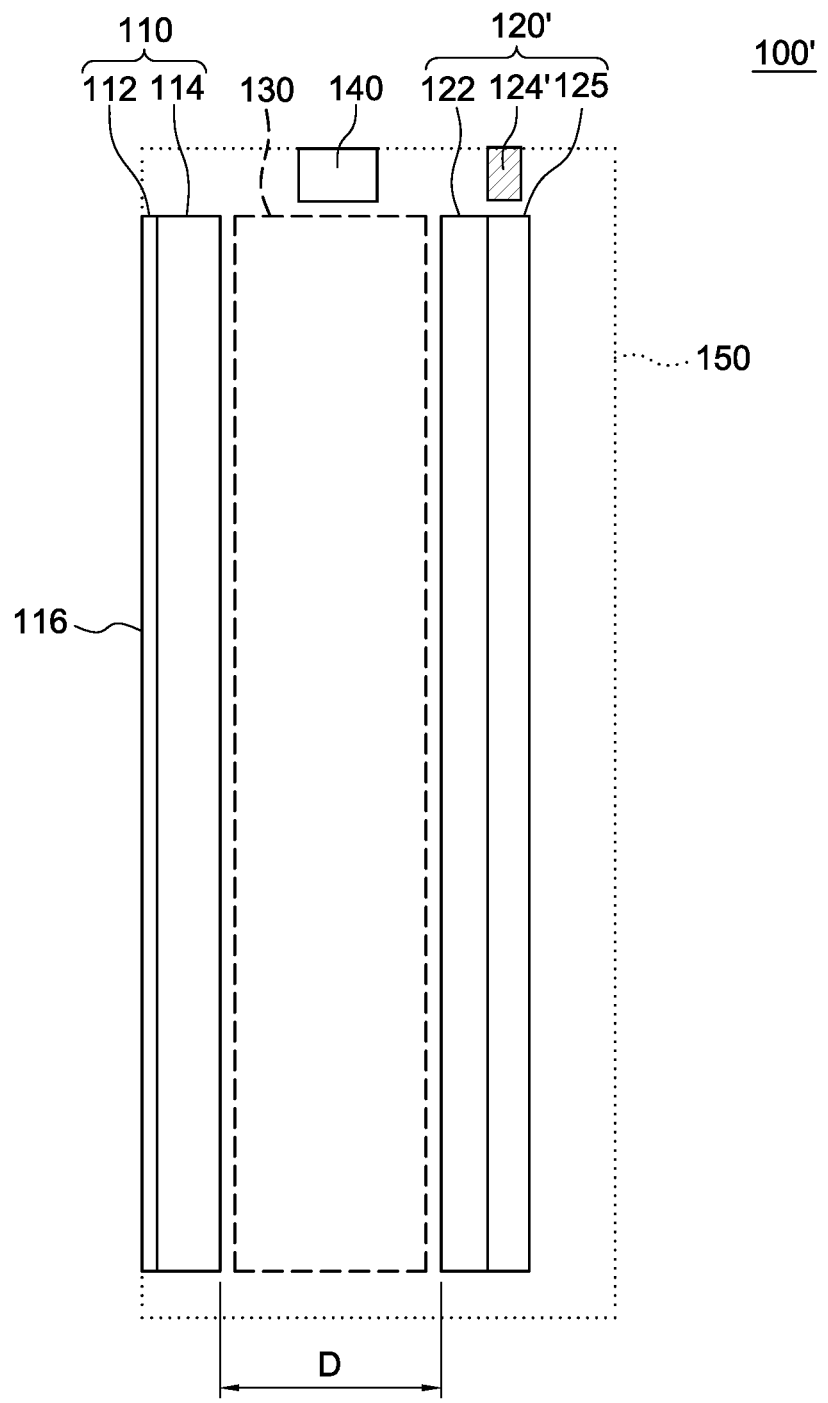
FIG. 1B is a cross-sectional view of a display apparatus according to some embodiments of the present disclosure.

FIG. 1B is a cross-sectional view of a display apparatus according to some embodiments of the present disclosure. As shown in FIG. 1B, the display apparatus 100' includes a display unit 110, a backlight module 120', an optical cavity 130, a sensing device 140, and a housing 150. In this embodiment, the display apparatus 100' can be, for example, a liquid crystal display with an edge-lit backlight module 120'. One difference between the display apparatus 100' shown in FIG. 1B and the display apparatus 100 shown in FIG. 1A is the structure of the backlight module. Specifically, the backlight module 120' includes one or more optical films 122, a light source 124' for side illumination, and a light guiding plate 125. The light source 124' is disposed at the rim of the display apparatus 100' for side illumination. The light sources 124' can be, for example, a plurality of LEDs. The light guiding plate 125 spreads the light evenly behind the display unit 110. The other components in the display apparatus 100' of FIG. 1B with the same reference numerals as those of the display apparatus 100 of FIG. 1A refer to the same or similar components, and thus their detailed descriptions are not repeated here. For the sake of simplicity, a liquid crystal display with a direct LED backlight module is described in the subsequent embodiments. Please note that a liquid crystal display with an edge-lit backlight module can also be used in the subsequent embodiments, which is not limited herein.

Figure 2:
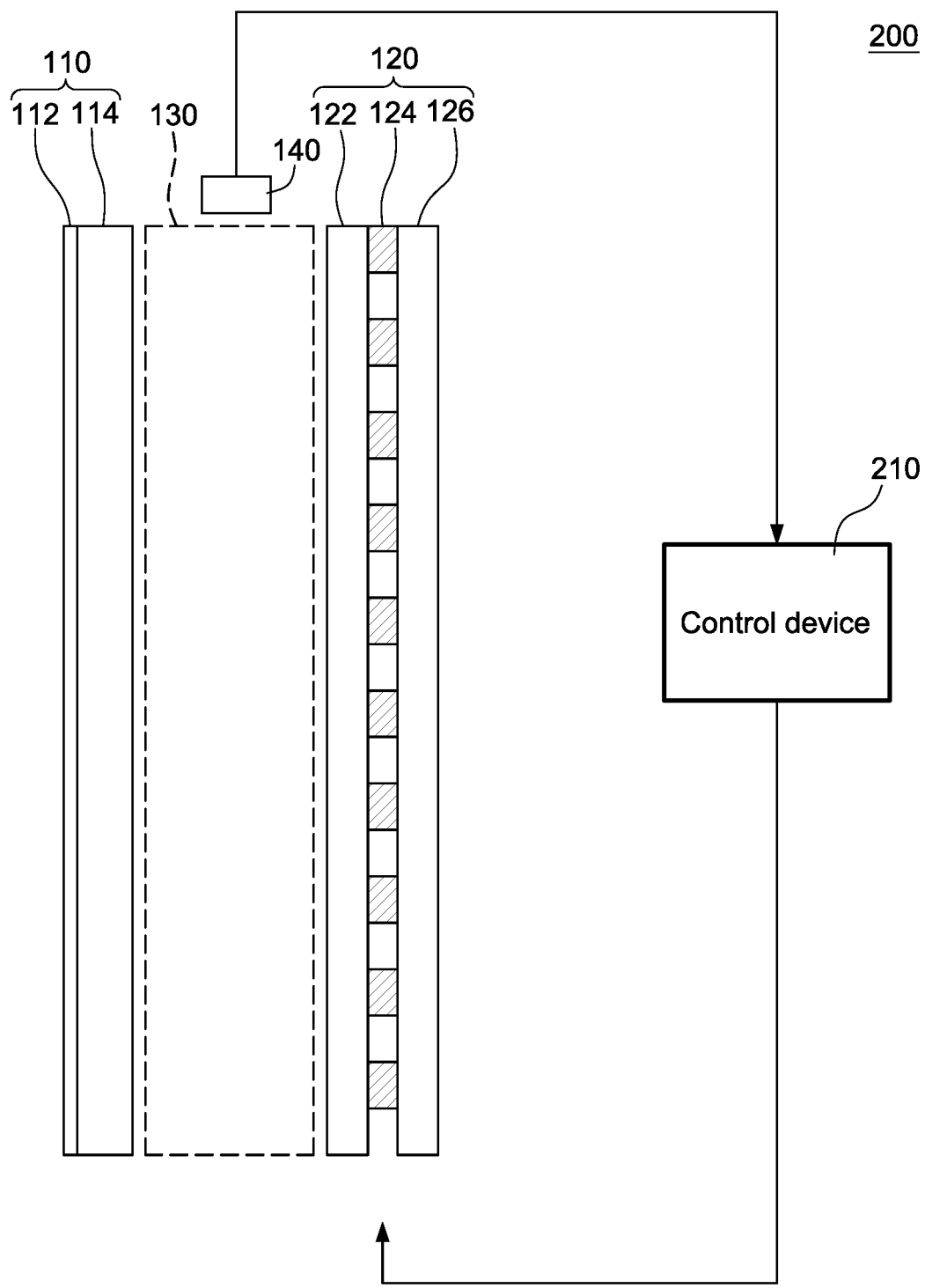
FIG. 2 is a cross-sectional view of a display apparatus according to some embodiments of the present disclosure.

FIG. 2 is a cross-sectional view of a display apparatus according to some embodiments of the present disclosure. As shown in FIG. 2, the display apparatus 200 includes a display unit 110, a backlight module 120, an optical cavity 130, and a sensing device 140. The display unit 110 includes a protective glass 112 and a liquid crystal layer 114. The backlight module 120 includes one or more optical films 122, light sources 124, and a backlight assembly 126. One difference between the display apparatus 200 shown in FIG. 2 and the display apparatus 100 shown in FIG. 1A is that the control device 210 of the display apparatus 200 shown in FIG. 2 is electrically connected to the sensing device 140. The control device 210 can be any commercially available controller or microprocessor or the like.

It should be noted that heat generated by the sunlight irradiated on the display unit 110 and heat generated by the light sources 124 of the backlight module 120 may cause the temperature of the liquid crystal layer 114 to rise rapidly and/or cause other components in the display apparatus 200 to accumulate heat energy. This may damage the liquid crystal layer 114 or other electrical components of the display apparatus 200. Therefore, in this embodiment, the sensing device 140 can be, for example, a temperature sensing device for sensing the temperature of the liquid crystal layer 114. The sensed data (e.g., the measured temperature) can be transmitted to the control device 210. The control device 210 determines whether the measured temperature is greater than a threshold. If the measured temperature is greater than the threshold, the control device 210 may send a command and/or driving signals to the backlight module 120 to control the operations of the backlight module 120. For example, the command and/or driving signals can cause the backlight module 120 to reduce the brightness of the light sources 124 so as to decrease the heat generated inside the display apparatus 200. For example, the brightness may be reduced by approximately 50%. The adjustment of the percentage of brightness can be set based on situational needs and is not limited here. In another embodiment of the present disclosure, the sensing device 140 can be, for example, an ambient light sensor. The ambient light sensor can measure ambient light entering the display unit 110. The sensed data (e.g., the measured brightness information) can be transmitted to the control device 210. The control device 210 can send a command and/or driving signals to the backlight module 120 based on the measured brightness information to perform brightness adjustment such that a viewer can clearly see what the display apparatus 200 displays.

Figure 3:
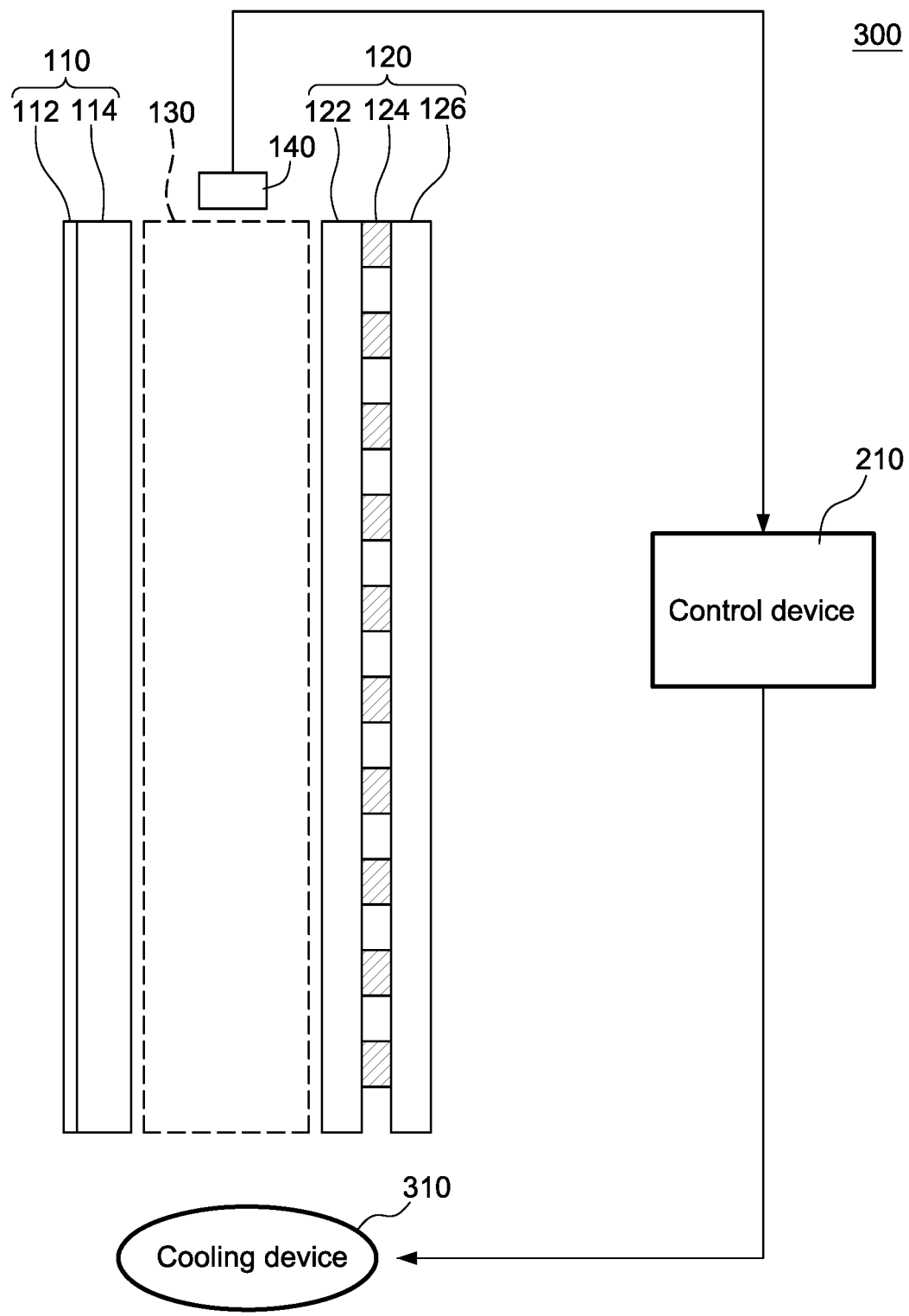
FIG. 3 is a cross-sectional view of a display apparatus according to some embodiments of the present disclosure.

FIG. 3 is a cross-sectional view of a display apparatus according to some embodiments of the present disclosure. As shown in FIG. 3, the display apparatus 300 includes a display unit 110, a backlight module 120, an optical cavity 130, a sensing device 140, a control device 210, and a cooling device 310. The display unit 110 includes a protective glass 112 and a liquid crystal layer 114. The backlight module 120 includes one or more optical films 122, light sources 124, and a backlight assembly 126. The display apparatus 300 of FIG. 3 is similar to the display apparatus 200 of FIG. 2, except that the display apparatus 300 shown in FIG. 3 further includes a cooling device 310.

In this embodiment, the sensing device 140 may include, for example, a temperature sensing device for sensing the temperature of the liquid crystal layer 114 and another temperature sensing device for sensing the temperature of the backlight module 120. The sensed data (e.g., the measured temperatures) can be transmitted to the control device 210. The control device 210 determines whether the measured temperatures are greater than a threshold. If a measured temperature is greater than the threshold, the control device 210 can send a command and/or driving signals to drive/control the operations of the cooling device 310. In some embodiments, the cooling device 310 may include a heat exchange device (not shown) and/or an air flow generator (not shown). The heat exchange device and/or the air flow generator can, for example, increase the thermal convection of the optical cavity 130 to dissipate heat from the display unit 110, the cavity 130, or the backlight module 120, thereby effectively reducing the temperature of the display unit 110 and reducing heat energy inside the display apparatus 300. It should be noted that, in some embodiments, the control device 210 can send commands and/or driving signals to drive or control the backlight module 120 and the cooling device 310.

Figure 4:
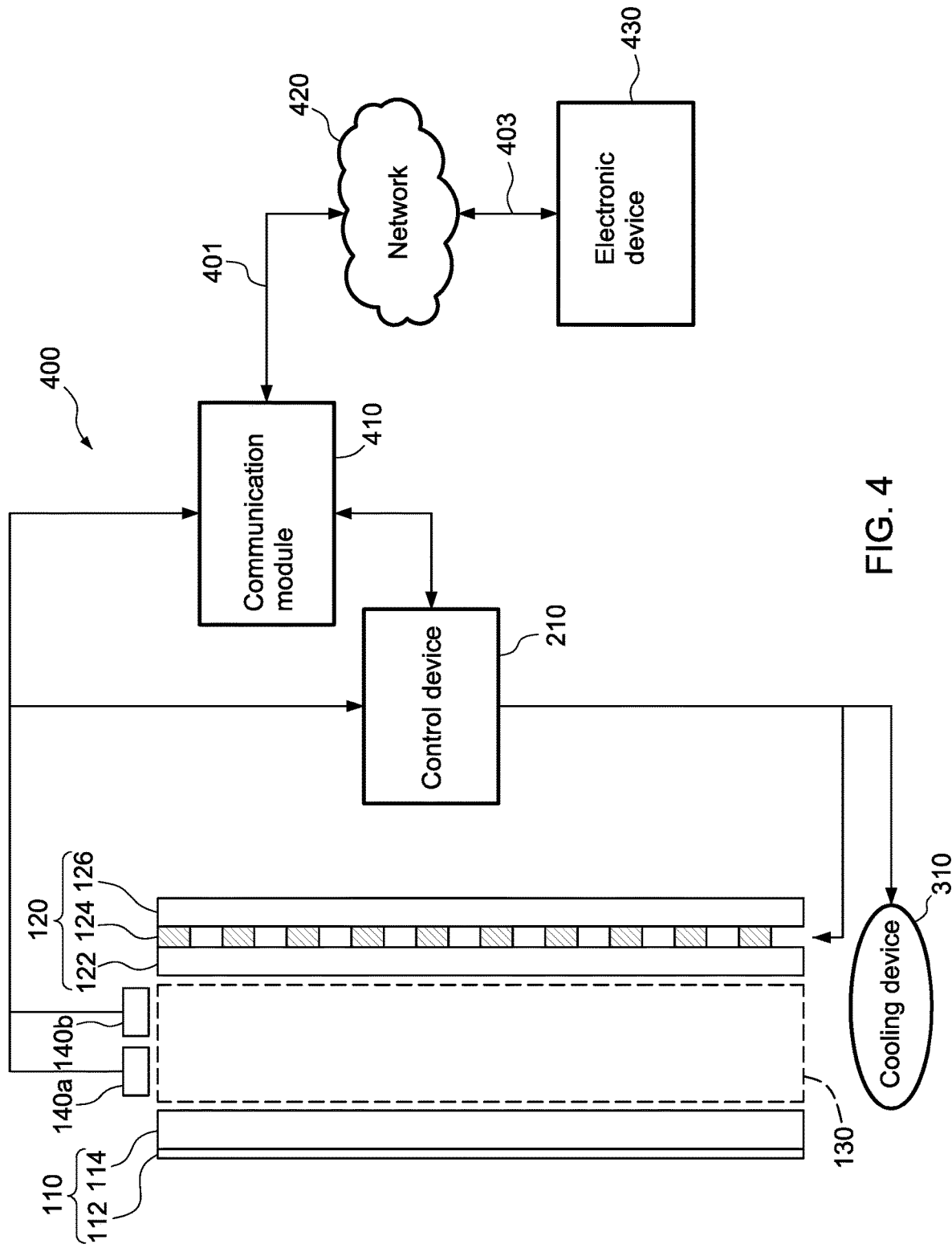
FIG. 4 is a schematic diagram of controlling a display apparatus according to some embodiments of the present disclosure.

FIG. 4 is a schematic diagram of controlling a display apparatus 400 according to some embodiments of the present disclosure. As shown in FIG. 4, the display apparatus 400 includes a display unit 110, a backlight module 120, an optical cavity 130, sensing devices 140a and 140b, a control device 210, a cooling device 310, and a communication module 410. The display unit 110 includes a protective glass 112 and a liquid crystal layer 114. The backlight module 120 includes one or more optical films 122, light sources 124, and a backlight assembly 126 for mounting the light sources 124. In this embodiment, the sensing device 140a can be, for example, a temperature sensing device. The sensing device 140b can be, for example, a camera or an ambient light sensor. The display apparatus 400 of FIG. 4 is similar to the display apparatus 300 of FIG. 3, except that the display apparatus 400 further includes the communication module 410. The communication module 410 is electrically connected to the sensing devices 140a and 140b and the control device 210. The communication module 410 can include wired and/or wireless components which provide connection to an external network 420. Network links 401 and 403 can be wired or wireless. The electronic device 430 can be, for example, a mobile phone, a tablet, a notebook, a desktop, or some other electronic device having a screen, and is used for receiving data from the display apparatus 400.

In this embodiment, the communication module 410 is used for receiving the sensed data (e.g., a captured image, the measured brightness or the temperature information) directly from the sensing devices 140a and 140b or through the control device 210. The communication module 410 of the display apparatus 400 transmits the sensed data to the electronic device 430 via the network 420. A user of the electronic device 430 may determine whether the display apparatus 400 should be adjusted based on the receiving data about the captured image, the measured brightness or the temperature information of the display apparatus 400. In some embodiments, the display apparatus 400 may be placed outdoors for displaying advertisements. The user of the electronic device 430 may be an administrator or owner of the display apparatus 400 or an advertiser. Therefore, the administrator or owner of the display apparatus 400 and/or the advertiser can monitor whether the operation of the display device 400 is normal based on the receiving data through a software application of the electronic device 430. If not, the administrator or owner of the display apparatus 400 and/or the advertiser may set one or more parameters for adjusting the display apparatus 400 using the software application. Then, the electronic device 430 transmits the parameters and/or other control signals to the display apparatus 400 via the network 420. The communication module 410 receives the parameters and/or control signals and transmits them to the control device 210 such that the control device 210 can drive/control the operations of the backlight module 120 and/or the cooling device 310 (e.g., adjusting the brightness of the light sources 124 or turning on/off the cooling device 310).

In this embodiment, the sensing device 140a can be, for example, a temperature sensing device. The temperature sensing device detects the temperature of the liquid crystal layer 114 and then transmits the measured temperature to the control device 210 and the communication module 410. The control device 210 can determine whether the measured temperature is greater than a predetermined threshold. If the measured temperature is greater than a predetermined threshold, the control device 210 can automatically drive/control the backlight module 120 and the cooling device 310 to adjust the temperature of the liquid crystal layer 114. Additionally, the communication module 410 also transmits the measured temperature to the external electronic device 430. The electronic device 430 shows the measured temperature on a screen such that a user of the electronic device 430 (e.g., the administrator or owner of the display apparatus 400) can determine whether the measured temperature of the liquid crystal layer 114 is in the normal range or whether the measured temperature of the liquid crystal layer 114 is too high. If the user determines that the temperature of the liquid crystal layer 114 should be adjusted, then he/she can set one or more parameters using the software application on the electronic device 430. The parameters can be, for example, the percentage of brightness of the light sources 124 or the operation mode (e.g., turned-on mode, turned-off mode or turbo mode) of the cooling device 310. Then, the external electronic device 430 transmits the parameters and/or other control signals to the communication module 410 of display apparatus 400 via the network 420. The communication module 410 receives the parameters and/or control signals and transmits them to the control device 210 such that the control device 210 can drive/control the operations of the backlight module 120 and/or the cooling device 310.

Figure 5:
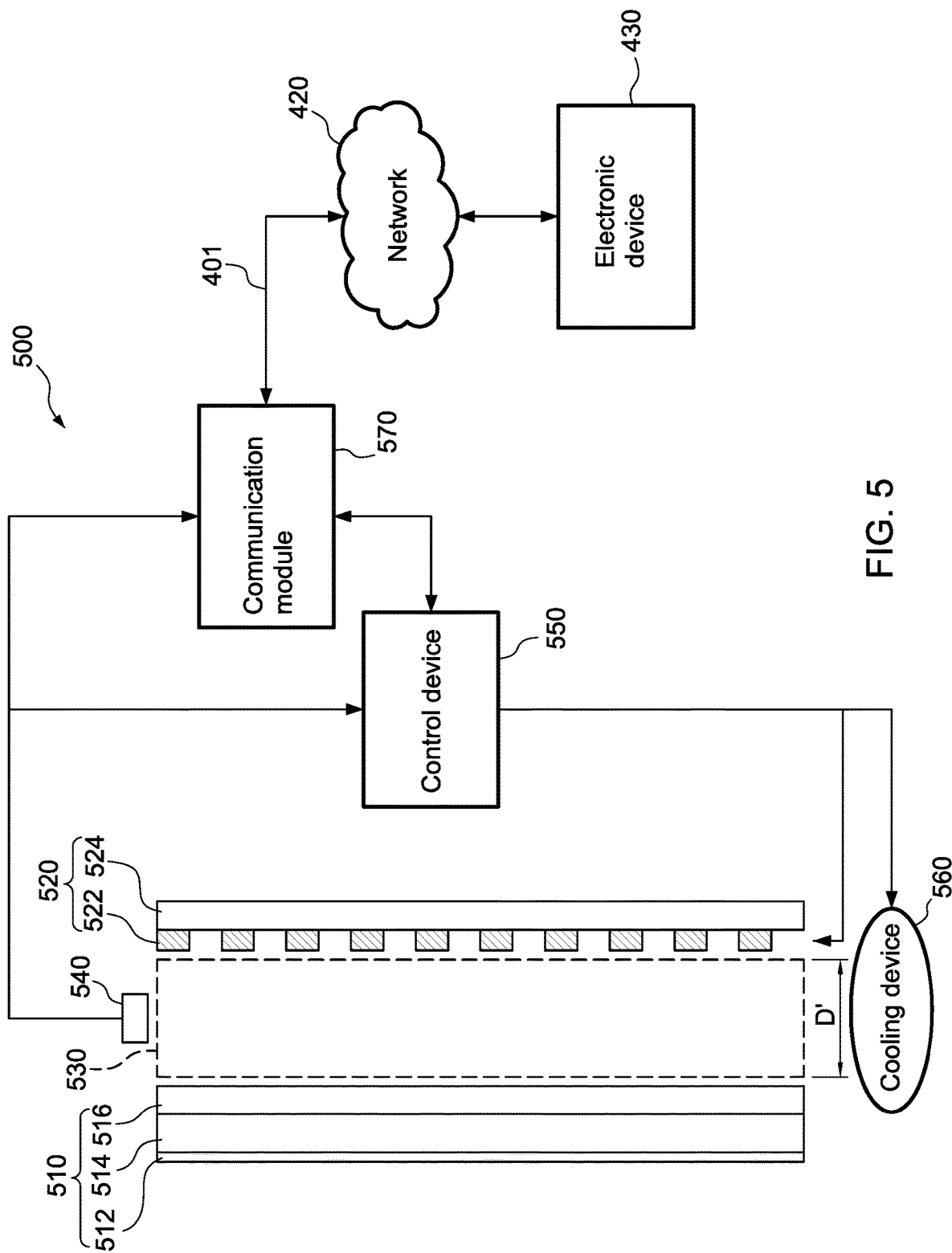
FIG. 5 is a schematic diagram of controlling a display apparatus 500 according to some embodiments of the present disclosure.

FIG. 5 is a schematic diagram of controlling a display apparatus 500 according to some embodiments of the present disclosure. As shown in FIG. 5, the display apparatus 500 includes a display unit 510, a backlight module 520, an optical cavity 530, a sensing device 540, a control device 550, a cooling device 560, and a communication module 570. The control device 550, the cooling device 560, and the communication module 570 shown in FIG. 5 are similar to the control device 210, the cooling device 310, and the communication module 410 shown in FIG. 4, and thus details of these components are not repeated here. In this embodiment, the display apparatus 500 can be, for example, a liquid crystal display. The display unit 510 includes a protective glass 512, a liquid crystal layer 514, and one or more optical films 516. The one or more optical films 516 can be, for example, a light diffuser, a light reflector, a brightness enhancement film, or a combination of two or more thereof. The backlight module 520 includes light sources 522 and a backlight assembly 524. The light sources 522 can be, for example, a plurality of LEDs, which may be placed on the front surface of the backlight assembly 524 to provide backlight illumination for the display unit 510. As shown in FIG. 5, the optical cavity 530 is formed between the display unit 510 and the backlight module 520 and, particularly, formed between the one or more optical films 516 and the light sources 522 of the backlight module 520. The distance D' between the optical films 516 and the light sources 522 is at least approximately 0.1 mm. It should be noted that the distance D' can be properly adjusted based on situational needs such that the sensing device 140 can be arranged between the optical films 516 and the light sources 522 and can accurately detect the image shown on the display unit 510 through the optical cavity 530.

The sensing device 540 is disposed on the periphery of the optical cavity 530. The sensing device 540 can be, for example, mounted on an inner side of a housing (not shown in FIG. 5). In one aspect of this embodiment, the sensing device 540 is preferably a light sensor which is disposed facing toward the display unit 510 or the optical cavity 530. The light sensor can measure ambient light entering the display unit 510 through the optical cavity 530. The sensed data (e.g., measured brightness information) can be transmitted to the control device 550. The control device 550 can automatically perform brightness adjustment based on the measured brightness information such that a viewer can clearly see what the display apparatus 500 displays. Furthermore, if the sensed data varies with time, the control device 550 determines that the display is functioning properly. Otherwise, the control device 550 may determine that the display is malfunctioning and inform the user of the situation via the communication module 570. It should be noted that the sensed data (e.g., measured brightness information) can also be transmitted to an external electronic device 430 via a network 420.

In another aspect of this embodiment, the sensing device 540 is preferably a camera which is disposed facing toward the display unit 510. The camera can capture an image from a portion of the display unit 510 through the optical cavity 530. If the image captured by the camera varies with time, the control device 550 determines that the display is functioning properly. Otherwise, the control device 550 may determine that the display is malfunctioning and inform the user of the situation via the communication module 570.

It is not suggested using a temperature sensing device to implement the sensing device 540. Since the optical cavity 530 is between the optical films 516 and the light sources 522 of the backlight module 520, the temperature sensing device can directly measure the temperature of the optical films 516 rather than the temperature of the liquid crystal layer 514. In some cases, the display apparatus 500 may be placed outdoors. If the protective glass 512 and the liquid crystal layer 514 of the display apparatus 500 are irradiated by direct sunlight, then the temperature of the protective glass 512 and the liquid crystal layer 514 will rise rapidly. It should be noted that the difference between the measured temperature of the optical films 516 obtained by the sensing device 540 and the actual temperature of the protective glass 512 and the liquid crystal layer 514 may be greater than 20° C. Additionally, the difference between the measured temperature of the optical films 516 obtained by the sensing device 540 and the actual temperature of the protective glass 512 and the liquid crystal layer 514 changes with time and environment. Therefore, since the relationship between the measured temperature of the optical films 516 and the actual temperature of the protective glass 512 and the liquid crystal layer 514 is not linear, it may be difficult to deduce or infer the actual temperature of the liquid crystal layer 514 from the measured temperature of the optical films 516.

Figure 6:
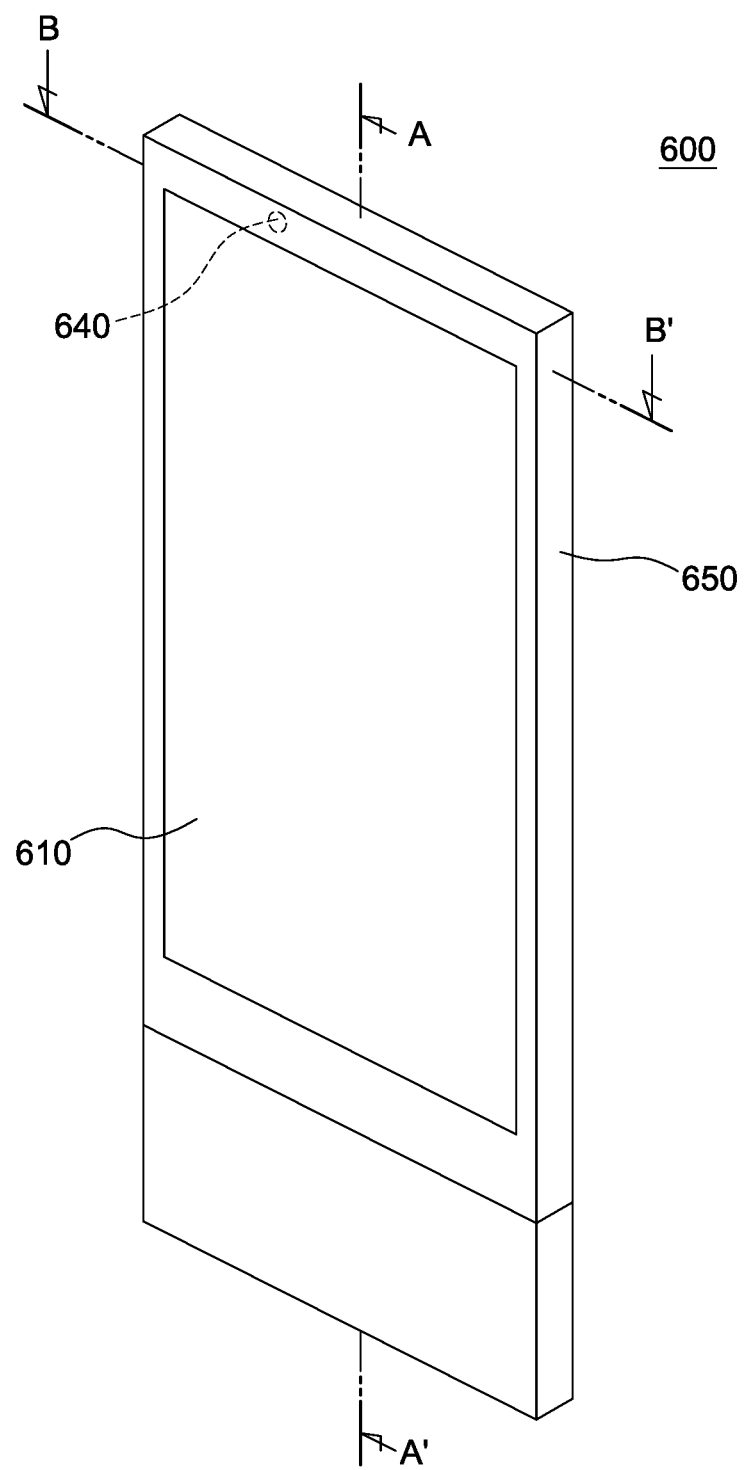
FIG. 6 is a stereoscopic diagram of a display apparatus 600 according to some embodiments of the present disclosure.
Figure 7:
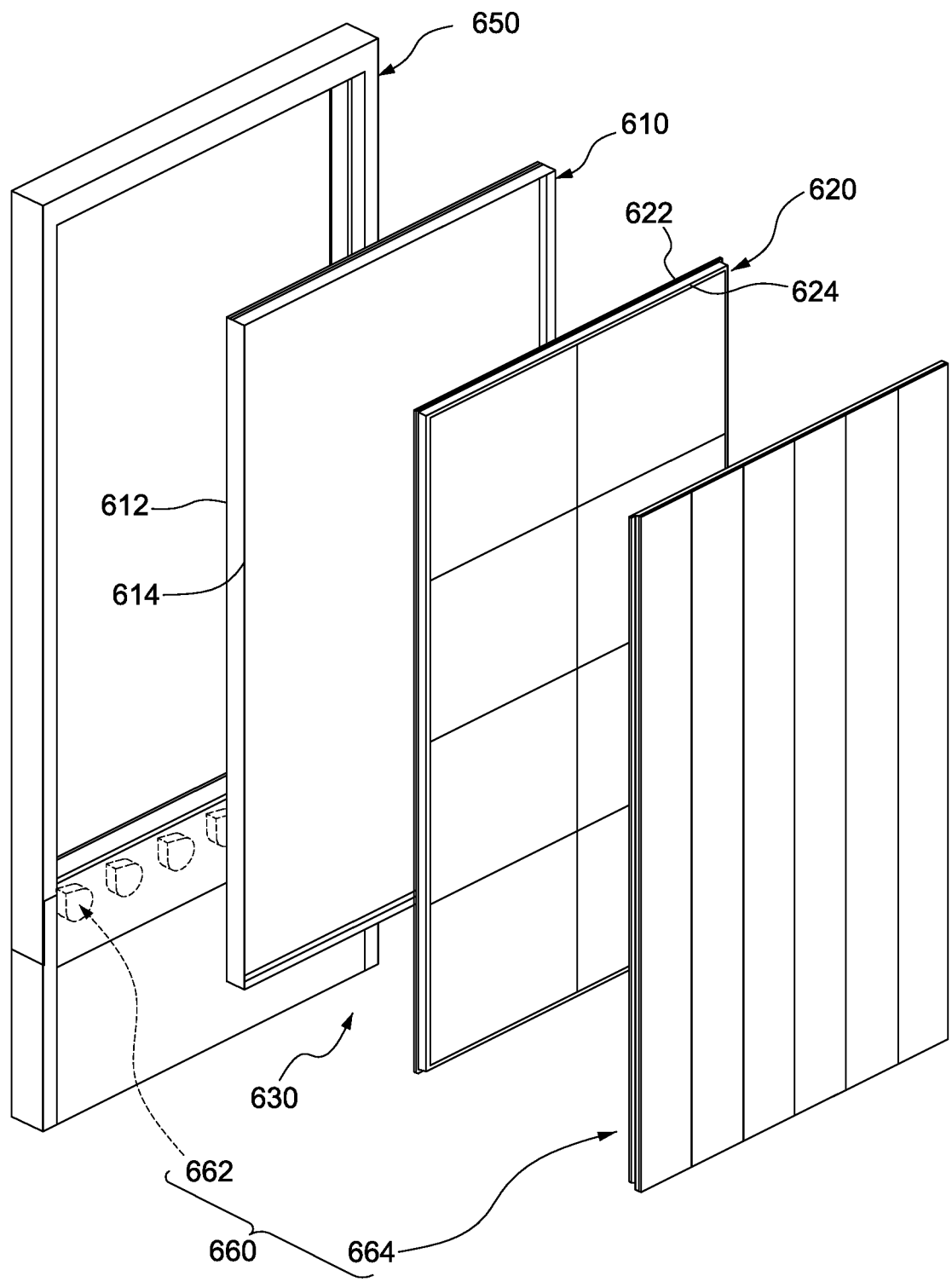
FIG. 7 is an exploded perspective view of the display apparatus 600 of FIG. 6.
Figure 8:
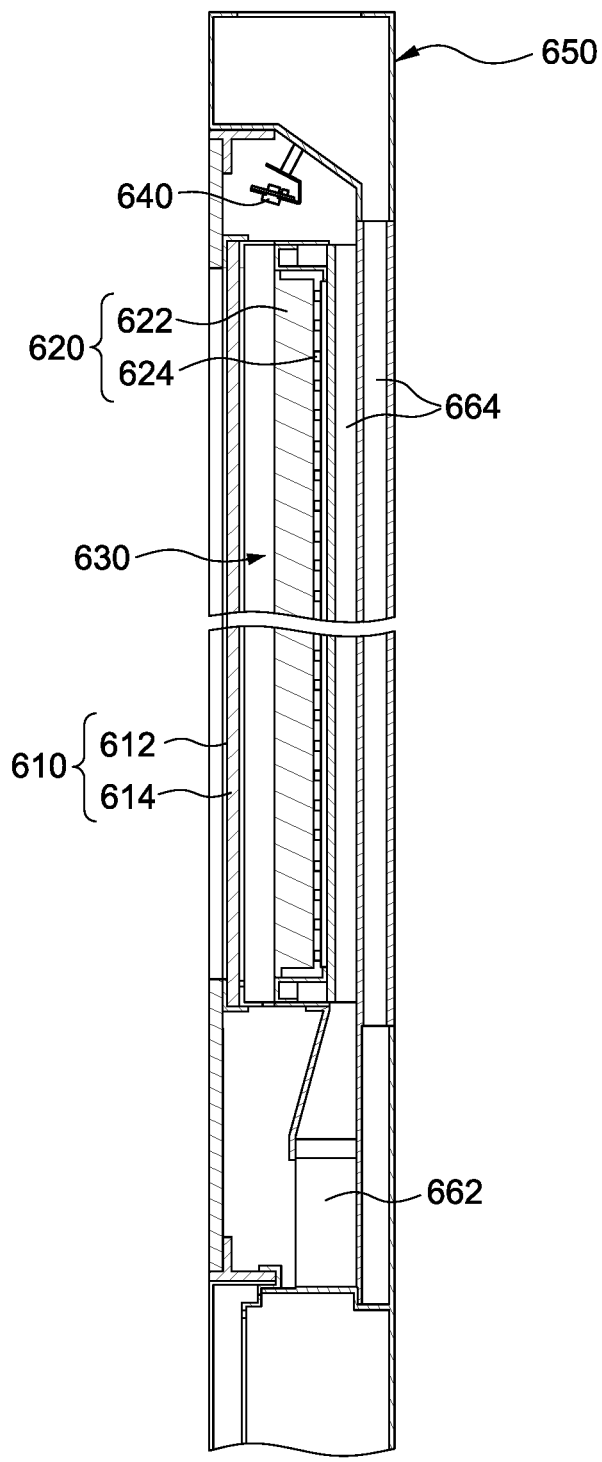
FIG. 8 is a cross-sectional view of the display device of FIG. 6 taken along line A-A'.
Figure 9:
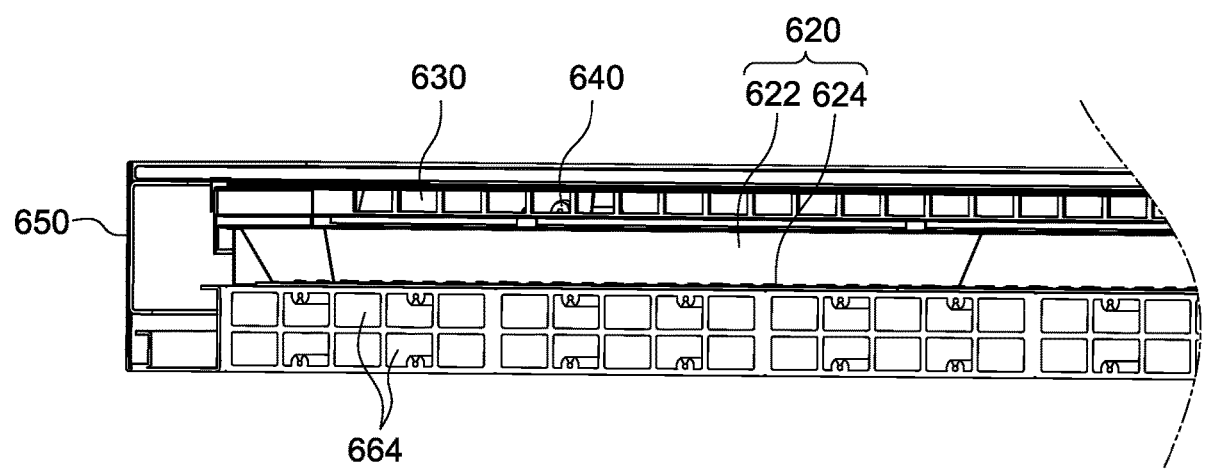
FIG. 9 is a cross-sectional view of the display device of FIG. 6 taken along line B-B'.

FIG. 6 is a stereoscopic diagram of a display apparatus 600 according to some embodiments of the present disclosure. FIG. 7 is an exploded perspective view of the display apparatus 600 of FIG. 6. FIG. 8 is a cross-sectional view of the display device of FIG. 6 taken along line A-A'. FIG. 9 is a cross-sectional view of the display device of FIG. 6 taken along line B-B'. In this embodiment, the display apparatus 600 is a direct-LED liquid crystal display. As shown in FIGS. 6 and 7, the display apparatus 600 includes a display unit 610, a backlight module 620, an optical cavity 630, a sensing device 640, a housing 650, and a cooling device 660. The display unit 610 includes a protective glass 612 and a liquid crystal layer 614. The backlight module 620 includes an optical film 622 and a backlight assembly 624 with light sources. The cooling device 660 includes an air flow generator 622 and a heat exchange device 664. In this embodiment, the optical cavity 130 is formed between the liquid crystal layer 614 and the optical film 622 of the backlight module 620. As shown in FIG. 8, the sensing device 640 is disposed on the periphery of the optical cavity 630 and within the housing 650. In this embodiment, the sensing device 640 faces toward the liquid crystal layer 614 so as to directly and accurately measure the temperature or illumination of the liquid crystal layer 614 or capture an image from the liquid crystal layer 614. As shown in FIGS. 8 and 9, since the sensing device 640 is completely hidden inside the display apparatus 600, a viewer cannot perceive the presence of the sensing device. It should be noted that the number of sensing devices 640 to be used can be determined based on situational needs.

As used herein, the singular terms "a," "an," and "the" may include plural referents unless the context clearly indicates otherwise. For example, reference to an electronic device may include multiple electronic devices unless the context clearly indicates otherwise.

As used herein, the terms "connect," "connected," and "connection" refer to an operational coupling or linking. Connected components can be directly or indirectly coupled to one another through, for example, another set of components.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless otherwise specifically indicated herein, the order and grouping of the operations are not limitations of the present disclosure.

What is claimed is:

1. A display apparatus, comprising:
a display unit comprising a liquid crystal layer;
a backlight module comprising an optical film;
an optical cavity formed between the liquid crystal layer of the display unit and the optical film of the backlight module; and
at least one sensing device disposed on a periphery of the optical cavity for sensing the liquid crystal layer of the display unit, wherein the at least one sensing device comprises a temperature sensing device to directly sense the temperature of the liquid crystal layer of the display unit.

2. The display apparatus of claim 1, further comprising a control device, wherein the sensed temperature is transmitted to the control device.

3. The display apparatus of claim 2, further comprising a cooling device, wherein the control device drives the cooling device according to the sensed temperature.

4. The display apparatus of claim 2, wherein the control device controls operations of the backlight module according to the sensed temperature.

5. The display apparatus of claim 1, wherein the at least one sensing device comprises a camera for capturing an image from a portion of the display unit.

6. The display apparatus of claim 1, wherein the at least one sensing device comprises a light sensor for sensing ambient light passing through the display unit.

7. The display apparatus of claim 6, further comprising a communication module for transmitting a message to an electronic device separated from the display apparatus in response to an output of the light sensor.

8. The display apparatus of claim 1, further comprising a housing surrounding the periphery of the optical cavity, wherein the at least one sensing device is mounted on an inner side of the housing and facing the optical cavity.

* * * * *